(12) United States Patent
Bae

(10) Patent No.: US 10,547,254 B2
(45) Date of Patent: Jan. 28, 2020

(54) APPARATUS FOR CONTROLLING MULTIPLE INVERTERS AND INVERTER SYSTEM INCLUDING THE SAME

(71) Applicant: LSIS CO., LTD., Anyang-si, Gyeonggi-do (KR)

(72) Inventor: Chae-Bong Bae, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 125 days.

(21) Appl. No.: 15/383,311

(22) Filed: Dec. 19, 2016

(65) Prior Publication Data

US 2017/0317616 A1    Nov. 2, 2017

(30) Foreign Application Priority Data

Apr. 29, 2016 (KR) .......................... 10-2016-0053429

(51) Int. Cl.
*H02P 5/74*     (2006.01)
*G05B 19/18*    (2006.01)
*H02P 23/00*    (2016.01)
*H02P 27/06*    (2006.01)

(52) U.S. Cl.
CPC .............. *H02P 5/74* (2013.01); *G05B 19/182* (2013.01); *H02P 23/0004* (2013.01); *H02P 27/06* (2013.01); *G05B 2219/41293* (2013.01)

(58) Field of Classification Search
CPC .... H02P 5/74; H02P 5/46; H02P 27/06; H02P 23/0004; G05B 19/182; G05B 2219/41293; F04B 49/20; F04B 49/06; F04B 41/06; F04B 17/03; F04B 2203/0209

USPC ......................................................... 700/275
See application file for complete search history.

(56) References Cited

U.S. PATENT DOCUMENTS

| 5,422,550 | A | * | 6/1995 | McClanahan | H02P 5/50 |
|---|---|---|---|---|---|
| | | | | | 318/103 |
| 6,686,712 | B2 | | 2/2004 | Numaguchi et al. | |
| 2004/0030414 | A1 | * | 2/2004 | Koza | G05B 11/42 |
| | | | | | 700/1 |
| 2006/0080980 | A1 | * | 4/2006 | Lee | F25B 49/022 |
| | | | | | 62/157 |

(Continued)

FOREIGN PATENT DOCUMENTS

| CN | 202117120 U | 1/2012 |
|---|---|---|
| JP | S50150853 A | 12/1975 |

(Continued)

OTHER PUBLICATIONS

Extended European Search Report dated Aug. 8, 2017 corresponding to application No. 16201177.9-1812.

(Continued)

*Primary Examiner* — Ziaul Karim
(74) *Attorney, Agent, or Firm* — K&L Gates LLP

(57) ABSTRACT

The present disclosure relates to an apparatus for controlling multiple inverters and an inverter system including the same. The apparatus according to the present disclosure determines a motor having the smallest operation time among motors which are not being operated as a main motor to thereby transmit a running reference and a frequency reference to the corresponding main motor, if a speed of a main motor which is being operated is above a speed set by a user and a feedback is below a predetermined level.

3 Claims, 6 Drawing Sheets

(56) References Cited

U.S. PATENT DOCUMENTS

2013/0162182 A1* 6/2013 Nee .................. H02P 15/00
318/380
2016/0006379 A1 1/2016 Wang et al.

FOREIGN PATENT DOCUMENTS

| JP | S59108886 A | 6/1984 |
|----|----|----|
| JP | S62198899 U | 12/1987 |
| JP | H0925874 A | 1/1997 |
| JP | H1172087 A | 3/1999 |
| JP | H11341816 A | 12/1999 |
| JP | 2003102188 A | 4/2003 |
| JP | 200583367 A | 3/2005 |
| JP | 3740118 B2 | 11/2005 |
| JP | 2006187071 A | 7/2006 |
| JP | 2006204023 A | 8/2006 |
| JP | 2008202555 A | 9/2008 |
| JP | 4293673 B2 | 4/2009 |
| JP | 2012052444 A | 3/2012 |
| JP | 201466454 A | 4/2014 |
| JP | 2014238015 A | 12/2014 |
| KR | 20-0246551 Y1 | 9/2001 |
| KR | 1020090071909 A | 7/2009 |
| KR | 1020110089326 A | 8/2011 |
| KR | 10-2015-0141316 | 12/2015 |
| KR | 101370026 B1 | 3/2016 |

OTHER PUBLICATIONS

Japanese Office Action dated Aug. 15, 2017 corresponding to application No. 2016-234571.
Korean Office Action dated Jul. 1, 2017 corresponding to application No. 1020160053429.
Japanese Office Action for related Japanese Application No. 2016-234571; action dated Apr. 3, 2018; (5 pages).
Japanese Office Action for related Japanese Application No. 2016-234571; action dated Aug. 27, 2019; (5 pages).

* cited by examiner

APPARATUS FOR CONTROLLING MULTIPLE INVERTERS AND INVERTER SYSTEM INCLUDING THE SAME

CROSS REFERENCE TO RELATED APPLICATION

This application claims the benefit of Korean Patent Application No. 10-2016-0053429, filed on Apr. 29, 2016, entitled "APPARATUS FOR CONTROLLING MULTIPLE INVERTERS AND INVERTER SYSTEM APPLYING THE SAME", which is hereby incorporated by reference in its entirety into this application.

BACKGROUND

1. Technical Field

The present disclosure relates to an apparatus for controlling multiple inverters and an inverter system including the same.

2. Description of the Related Art

In general, in applications for mainly controlling flow rate and flow pressure, such as a fan or a pump, a multi-motor control is widely used, which reduces energy consumption by controlling a plurality of motors using one controller while reducing facility cost by saving total cost of ownership (TCO) of the entire system.

For example, in a system where a plurality of motors is connected to a single inverter to be controlled, such as a pipe system, it is general to perform a proportional integral derivative (PID) control by receiving a feedback signal indicative of the pressure of a pipe. Here, in the case where the feedback of the pipe is less than a set reference value even though a speed of a main motor which is directly connected to the inverter to be operated is a set speed or more by a manager, one or more auxiliary motors connected to the inverter through a relay to generate pressure required by the system is additionally run.

Here, examples of a method for additionally connecting the auxiliary motor to the inverter includes a line starting method for directly connecting a power source voltage to the auxiliary motor using an electronic switch, a star connection of when a winding of an induction machine starts using three electronic switches, and a start-delta soft starter method of converting the start connection into a delta connection during a running.

Among these, the line starting method has problems in that a large inrush current occurs in the motor to thereby cause damage on the motor, as well as to also cause damage on a contact point of the switch. Further, the star-delta soft starter method alleviates the problem of the inrush current, but should require the three switches and should also use a timer or an auxiliary switch on the periphery, and in some cases, some motors do not support a star-delta connection conversion. As a result, the star-delta soft starter method may not be used for all cases. That is, since a motor of three-phase 380V or 440V is typically manufactured to be used in the delta connection in a power source of 220V and the star connection in a power source of 380V or 440V, a motor operated in the power source of 220V is possible to perform a star-delta starting, but has a condition in the power source of 380V or 440V that a rated voltage is applied to the winding of the motor. For purpose of this condition, there is a problem that a specially manufactured motor is required.

To solve such a problem, a method in which a separate inverter is connected to each of the motors to control the speed of each of the motors is used.

However, in this case, since the inverter is connected to all of the motors, there is a problem that it is difficult to set the inverter, and an entire lifespan of the system is reduced because a running time of a specific inverter is increased.

SUMMARY

It is an aspect of the present disclosure to provide an apparatus for controlling a multiple inverters in which the multiple inverters are controlled by one inverter in a system including the multiple inverters and motors, and an inverter system including the same.

In accordance with one aspect of the present disclosure, an apparatus for controlling multiple inverters includes a first communicating unit receiving a feedback from a sensor; a second communicating unit receiving information related to a state including an accumulated operation time of motors connected to the multiple inverters, from each of the multiple inverters, and each transmitting a running reference and a frequency reference to each of the multiple inverters; and a controlling unit determining a motor having the smallest operation time among motors which are not being operated as a new main motor to thereby transmit the running reference and the frequency reference to an inverter connected to the main motor which is newly determined, if a speed of a main motor in operation is above a speed set by a user and the feedback is below a predetermined level.

The controlling unit may determine a motor having the smallest operation time upon starting as the new main motor to thereby transmit the running reference and the frequency reference to an inverter connected to the corresponding main motor.

The controlling unit may convert the main motor in operation into an auxiliary motor to thereby transmit the running reference and the frequency reference to an inverter connected to the corresponding converted auxiliary motor.

The controlling unit may transmit a stop command to the main motor which is being operated, and determine an auxiliary motor having the longest operation time among auxiliary motors in operation as the main motor to thereby transmit the frequency reference to an inverter connected to corresponding main motor, in the case where the speed of the main motor in operation is below a speed set by the user and the feedback is above a predetermined level.

The controlling unit may transmit the frequency reference so that the auxiliary motor is run at a fixed frequency, and transmit the frequency reference so that the main motor performs a proportional integral derivative (PID) drive.

The controlling unit may transmit the frequency reference so that the main motor and the auxiliary motor perform a PID drive.

In accordance with another aspect of the present disclosure, an inverter system applying an apparatus for controlling multiple inverters includes a sensor providing a feedback; multiple serve inverters transmitting information related to a state including an accumulated operation time of motors which are each connected to a leader inverter, and receiving a running reference and a frequency reference, respectively, from the leader inverter; and the leader inverter receiving the feedback from the sensor, and determining a motor having the smallest operation time among motors which being not used as a new main motor to thereby transmit the running reference and the frequency reference to a serve motor connected to the corresponding main motor, in the case where a speed of a main motor in operation is above a speed set by a user and the feedback is below a predetermined level.

The leader inverter determines a motor having the smallest operation time upon starting as the main motor to thereby transmit the running reference and the frequency reference to a serve inverter connected to the corresponding main motor.

The leader inverter may convert the main motor in operation into an auxiliary motor to thereby transmit the running reference and the frequency reference to a serve inverter connected to the corresponding converted auxiliary motor.

The leader inverter may transmit a stop command to the main motor which is being operated, and determine an auxiliary motor having the longest operation time among auxiliary motors in operation as the new main motor to thereby transmit the frequency reference to an inverter connected to the corresponding main motor, in the case where the speed of the main motor in operation is below a speed set by the user and the feedback is above a predetermined level.

As described above, according to the exemplary embodiments of the present disclosure, the sensor feedback is received by only the leader inverter to simplify the wirings, and all of the inverters are connected to allow the leader inverter to control the remaining inverters, thereby making it possible to easily set the system, and to conveniently monitor the state of the entire system.

Further, according to the exemplary embodiment of the present disclosure, since the leader inverter sequentially controls the multiple inverters, the stress of the system caused by the water hammering phenomenon may be removed, and the system may be stably maintained even though the problem occurs in a specific inverter.

Further, according to the exemplary embodiment of the present disclosure, the running time of the multiple inverters is uniformly distributed, thereby making it possible to prevent the problem that the running time of the specific inverter is increased to thereby decrease the entire lifespan of the system. Although the exemplary embodiments of the present disclosure have been described, they are only illustrative. It will be appreciated by those skilled in the art that various modifications and equivalent other embodiments are possible from the exemplary embodiment of present disclosure. Accordingly, the actual technical protection scope of the present disclosure should be defined by the following claims

DETAILED DESCRIPTION

Since the present disclosure may be variously modified and have several exemplary embodiments, specific exemplary embodiments will be shown in the accompanying drawings and be described in detail in a detailed description. However, it is to be understood that the present disclosure is not limited to a specific exemplary embodiment, but includes all modifications, equivalents, and substitutions without departing from the scope and spirit of the present disclosure.

Hereinafter, a method for controlling multiple inverters according to the related art will be schematically described with reference to the accompanying drawings, and an apparatus for controlling multiple inverters according to an exemplary embodiment of the present disclosure will be then described in detail with reference to the accompanying drawings.

Figure 1:
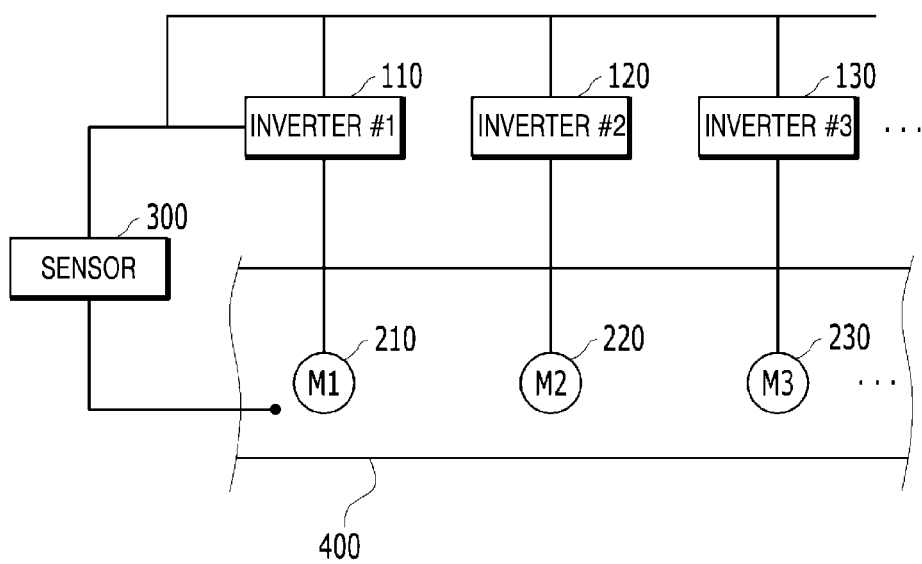
FIG. 1 is a configuration diagram of a multiple inverters system according to the related art.
Figure 2:
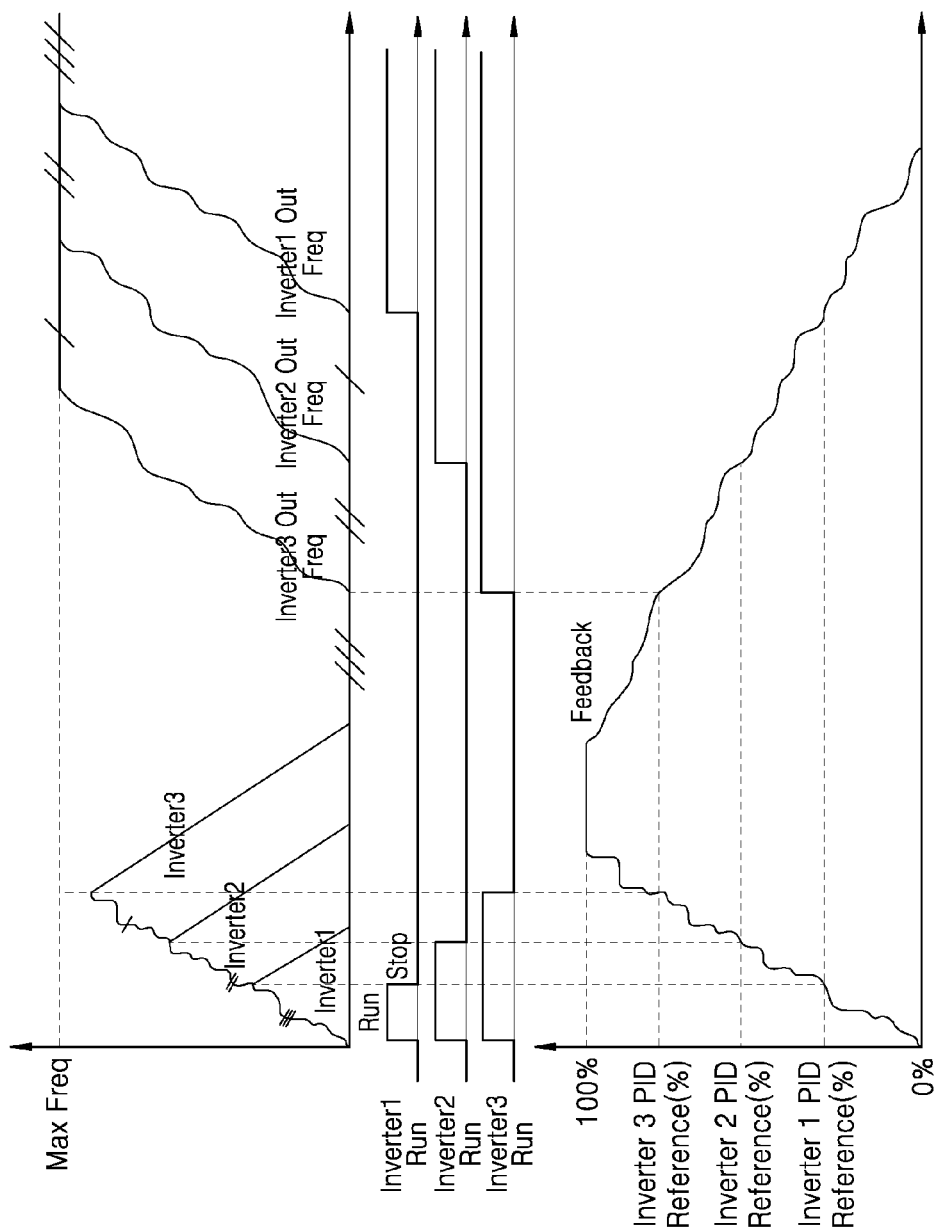
FIG. 2 is a graph illustrating operation sequences of the multiple inverters system according to the related art.
Figure 3:
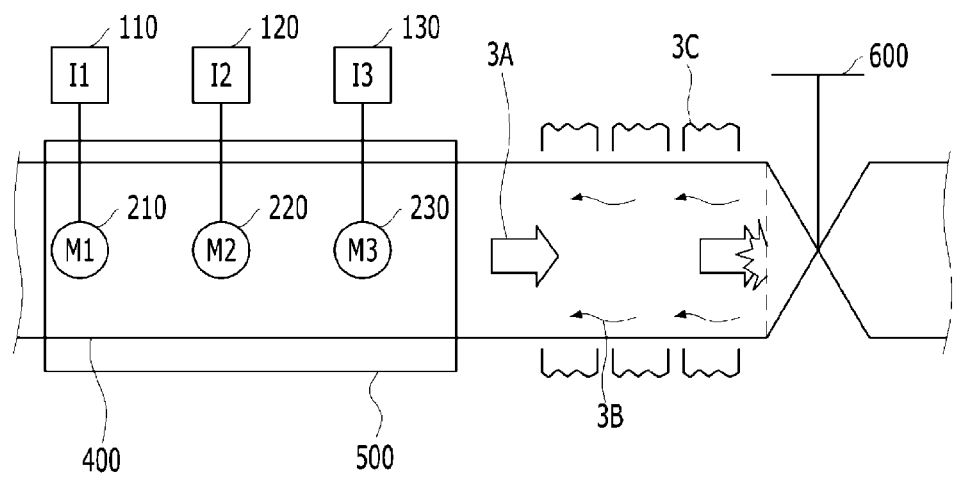
FIG. 3 is a diagram illustrating a problem occurring in the multiple inverters system according to the related art.

FIG. 1 is a configuration diagram of a multiple inverters system according to the related art. FIG. 2 is a graph illustrating operation sequences of the multiple inverters system according to the related art. In addition, FIG. 3 is a diagram illustrating a problem occurring in the multiple inverters system according to the related art.

As illustrated in FIG. 1, multiple inverters 110, 120, and 130 that drive multiple motors 210, 220, and 230 disposed on a flow path receive a feedback from the same sensor 300 to separately perform a PID control. Since each of the multiple inverters 110, 120, and 130 separately performs the PID control, all of the motors 210, 220, and 230 start a running in a state in which the feedback is 0 when a system starts. In addition, when the feedback is changed according to a situation of the system, each of the inverters 110, 120, and 130 performs the PID control according to a PID reference which is separately set.

Referring to FIG. 2, when the system starts, since the feedback, which is 0, is smaller than the PID reference of a first inverter to a third inverter 110, 120, and 130, each of the inverters 110, 120, and 130 starts the PID control. In the case where the feedback is increased according to the situation of the system, an inverter which is set to a small PID reference decelerates or stops the motor. As such, each of the inverters checks only own PID reference and an input feedback regardless of states of other inverters to thereby control only the motor connected to the corresponding inverter.

Since the system according to the related art as described above needs to connect the sensor 300 to all of the inverters 110, 120, and 130 for the feedback, wirings thereof are complex, and all of the inverters 110, 120, and 130 are simultaneously turned-on in a state in which the feedback is low when the system starts. Accordingly, as illustrated in FIG. 3, strong flow energy 3A collides with a closed valve 600 to cause impact energy, and stress occurs in the system by a water hammering phenomenon in which vibration 3C occurs by the above-mentioned impact.

In addition, since the system as illustrated in FIG. 1 needs to separately set all of inverters within a pump 500, it is difficult to set the inverter. In the case where a failure occurs in a specific inverter, since information on the corresponding inverter needs to be directly checked, it is difficult to mange. In addition, since the inverters are separately run by a set parameter, a running time of the specific inverter is increased and a running time of another specific inverter is decreased, thereby causing a problem that an entire lifespan of the system is decreased.

According to the present disclosure, in order to solve the above-mentioned problem, multiple inverters may include a leader inverter controlling other inverters, and serve inverters controlled by the leader inverter. The multiple inverters are connected to each other by a communication line, such that the leader inverter may control multiple serve inverters. The feedback of the sensor is received by only the leader inverter, thereby making it possible to simplify the wirings, and the stress imposed to the system such as the water hammering may be removed by sequentially controlling the multiple inverters. In addition, a user may check the entirety of the inverters and uniformly adjust the running time of the entirety of the inverters by setting only the leader inverter and checking a state of the leader inverter.

Figure 4:
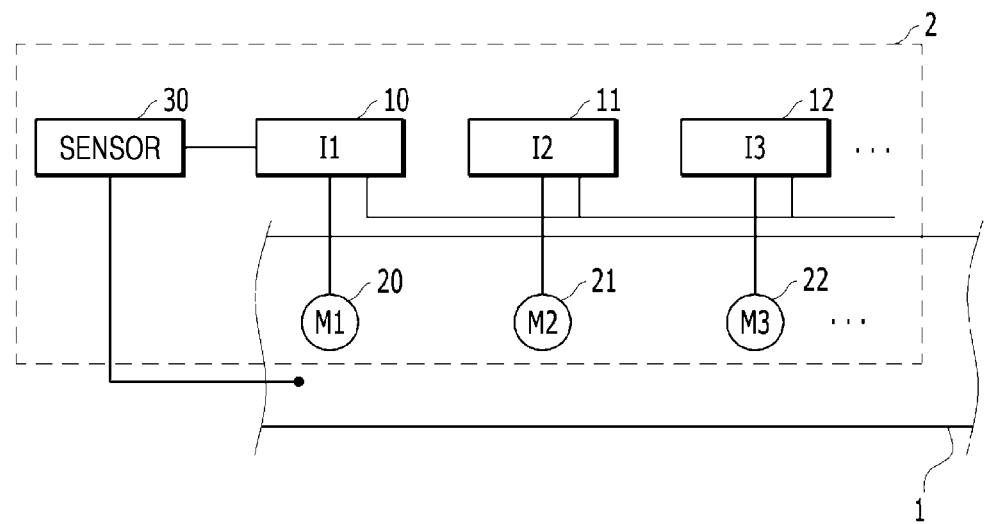
FIG. 4 is a configuration diagram schematically illustrating an inverter system according to an exemplary embodiment of the present disclosure.

FIG. 4 is a configuration diagram schematically illustrating an inverter system according to an exemplary embodiment of the present disclosure.

As illustrated in FIG. 4, the system according to an exemplary embodiment of the present disclosure, which is applied to a pump 2 provided to a pile 1, may include multiple motors 20, 21, and 22 disposed on the pipe 1, multiple inverters 10, 11, and 12 connected to the multiple motors 20, 21, and 22, respectively, and a sensor 30 receiving a proportional integral derivative (PID) feedback of the pipe 1 to provide the received PID feedback to a leader inverter.

Although an exemplary embodiment of the present disclosure describes the pump 2 provided to the pipe 1 by way of example, the present disclosure is not limited thereto. It will be apparent that the present disclosure may be applied to a system to which multiple motors and multiple inverters connected thereto are provided.

In addition, although an exemplary embodiment of the present disclosure describes an example in which three motors and three inverters connected thereto are included in the system, the present disclosure is not limited thereto. It will be apparent to those skilled in the art that more or less motors and inverters may be included in the system.

According to an exemplary embodiment of the present disclosure, the multiple inverters may include one leader inverter and the remaining serve inverters. Hereinafter, the first inverter 10 is referred to as a 'leader inverter 10', and the second and third inverters 11 and 12, which are the remaining inverters, are referred to as 'serve inverters'. Here, the serve inverters are referred to as a 'first serve inverter 11' and a 'second serve inverter 12'. The classification of the inverters as mentioned above may be changed according to a setting of the user. As described above, two or more serve inverters may be included.

Figure 5:
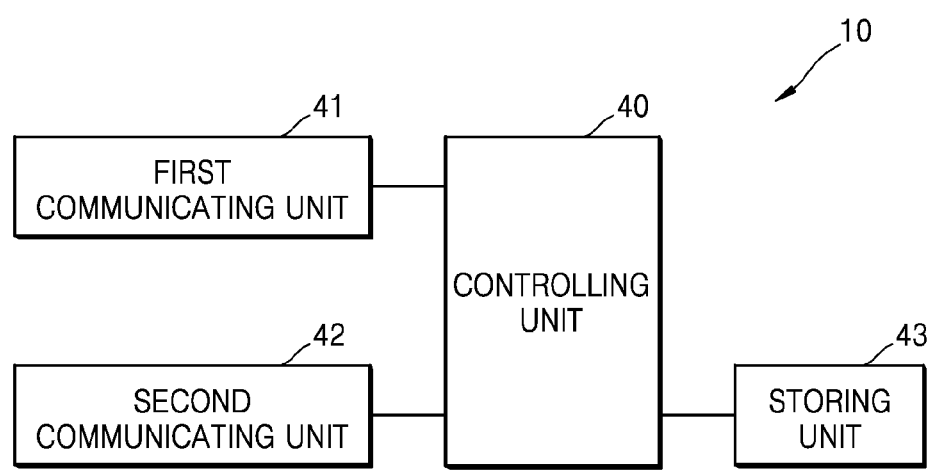
FIG. 5 is a configuration diagram schematically illustrating an apparatus for controlling multiple inverters according to an exemplary embodiment of the present disclosure.

FIG. 5 is a configuration diagram schematically illustrating an apparatus for controlling multiple inverters according to an exemplary embodiment of the present disclosure. The apparatus for controlling multiple inverters according to an exemplary embodiment of the present disclosure, which is provided to the leader inverter 10, may be a central process unit (CPU) or a micro-controller unit (MCU) provided in a housing of the leader inverter 10. However, this is illustrative, and the present disclosure is not limited thereto.

As illustrated in FIG. 5, the apparatus according to an exemplary embodiment of the present disclosure may include a controlling unit 40, a first communicating unit 41, a second communicating unit 42, and a storing unit 43.

The first communicating unit 41 may receive the PID feedback additionally or in real-time from the sensor 30.

The second communicating unit 42 may receive data related to state of the multiple serve inverters periodically or in real time, by a control of the controlling unit 40, and may transmit a drive instruction and a frequency reference periodically or in real time. Here, the date related to the state of the serve inverters may include, for example, whether or not the corresponding inverter fails, and an accumulated operation time of the corresponding serve inverter.

The storing unit 43 may store the data received from the multiple serve inverters by the control of the controlling unit 40. In addition, the storing unit 43 may also store parameters that the user sets using a human-machine interface (HMI) or an inverter loader According to an exemplary embodiment of the present disclosure, the controlling unit 40 may receive the PID feedback received from the sensor 30 through the first communicating unit 41, and may transmit a control command to the multiple serve inverters determined by the received PID feedback through the second communicating unit 42.

In addition, in the case where a specific serve inverter stops a running thereof by a failure, the controlling unit 40 may excludes the specific serve inverter from the running, and may receive the PID feedback from the sensor 30 to designate another serve inverter, thereby transmitting a control command to another serve inverter to start a running thereof. That is, the controlling unit 40 may receive the PID feedback from the sensor 30, and may control a running timing of the multiple serve inverters with reference to a PID reference of the leader inverter 10.

According to an exemplary embodiment of the present disclosure, a mode in which the controlling unit performs the control may be classified into a multi-master mode and a multi-follower mode, according to a method in which the leader inverter 10 controls the serve inverters, which will be described below, respectively.

[Multi-Master Mode]

The multi-master mode is a mode in which only a main motor is PID-controlled, and auxiliary motors which are being run are run at a fixed frequency such as a follower frequency which may be arbitrarily set by the user. Since only one main motor is PID-controlled and the remaining motors are run at the fixed speed, a rapid change on the entire system (a change of an amount of control according to the system such as pressure, flow rate, etc.) does not relatively occur. As a result, the stress on the entire system is small.

Figure 6:
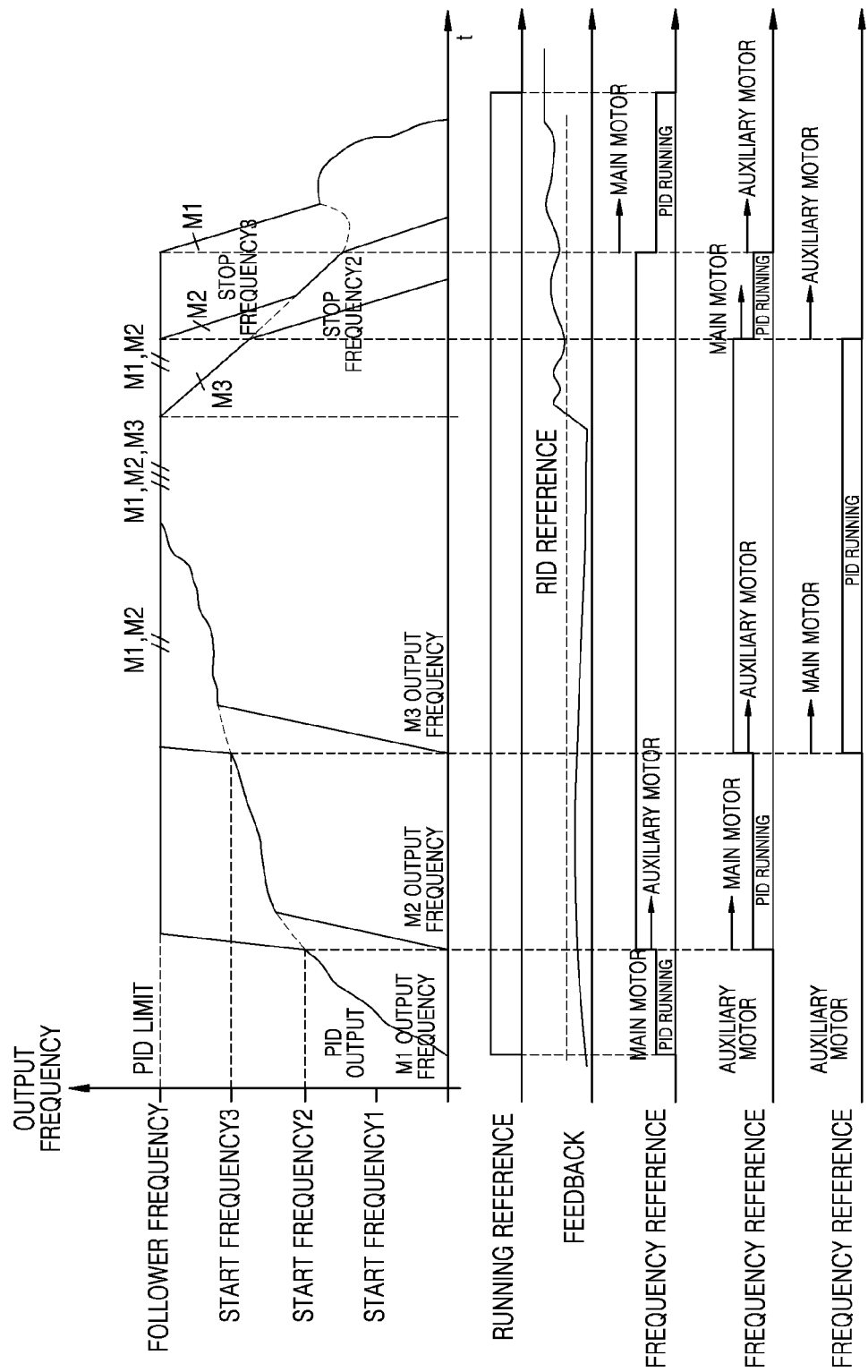
FIG. 6 is a graph illustrating a method in which a controlling unit according to an exemplary embodiment of the present disclosure performs a control in a multi-mask mode.

FIG. 6 is a graph illustrating a method in which a controlling unit according to an exemplary embodiment of the present disclosure performs a control in a multi-mask mode.

As illustrated in FIG. 6, since the feedback upon starting the system is smaller than the PID reference which is preset (i.e., stored in the storing unit 43), the controlling unit 40 may start the running by using a first motor 20 having the smallest running time as the main motor. However, according to an exemplary embodiment of the present disclosure, the first motor 20 connected to the leader inverter 10 is not run, but the motor having the smallest running time is run.

Here, even in the case where a running speed of the main motor 20 is a set speed (a start frequency 2 in FIG. 6) or more, when the feedback of the pipe 1 is less than the preset PID reference, the controlling unit 40 operates the first motor 20, which is currently being run, as the auxiliary motor to generate pressure required by the system, to thereby perform a control so that the first motor 20 is run at a fixed follower frequency which is set by the manager. In addition, the controlling unit 40 may select a motor (referred to as a second motor 21 in an exemplary embodiment of the present disclosure) having the shortest running time among the motors which are being stopped to thereby transmit a PID control command to the second motor 21 so that the selected motor is operated as the main motor.

Such an operation sequence may be repeated until all of the motors are run.

According to an exemplary embodiment of the present disclosure, although it is assumed that the running time is short in order of the first motor 20, the second motor 21, and the third motor 22, the order of motors which are run may be changed in other cases.

Thereafter, in the case where the feedback becomes greater than the set PID reference, the controlling unit 40 decelerates the running speed of the motor which is run as the main motor, and in the case where the feedback of the pipe 1 is a stop frequency or less which is preset by the manager, but is the set PID reference or more, the controlling unit 40 stops the motor which is currently being run as the main motor to decrease the feedback to the pressure required by the system. At the same time, the controlling unit 40 may convert a motor having the longest running time among the motors which are being run as the auxiliary motors, into the main motor to thereby transmit a control command so that the motor having the longest running time is PID-run.

As such, an operation sequence may be repeated until all of the motors are stopped.

[Multi-Follower Mode]

The multi-follower mode is a mode in which all of the motors connected to an inverter which is being run are controlled at the same PID output frequency. Since all of the motors perform a PID running, it is possible to rapidly cope with a rapid feedback change.

Figure 7:
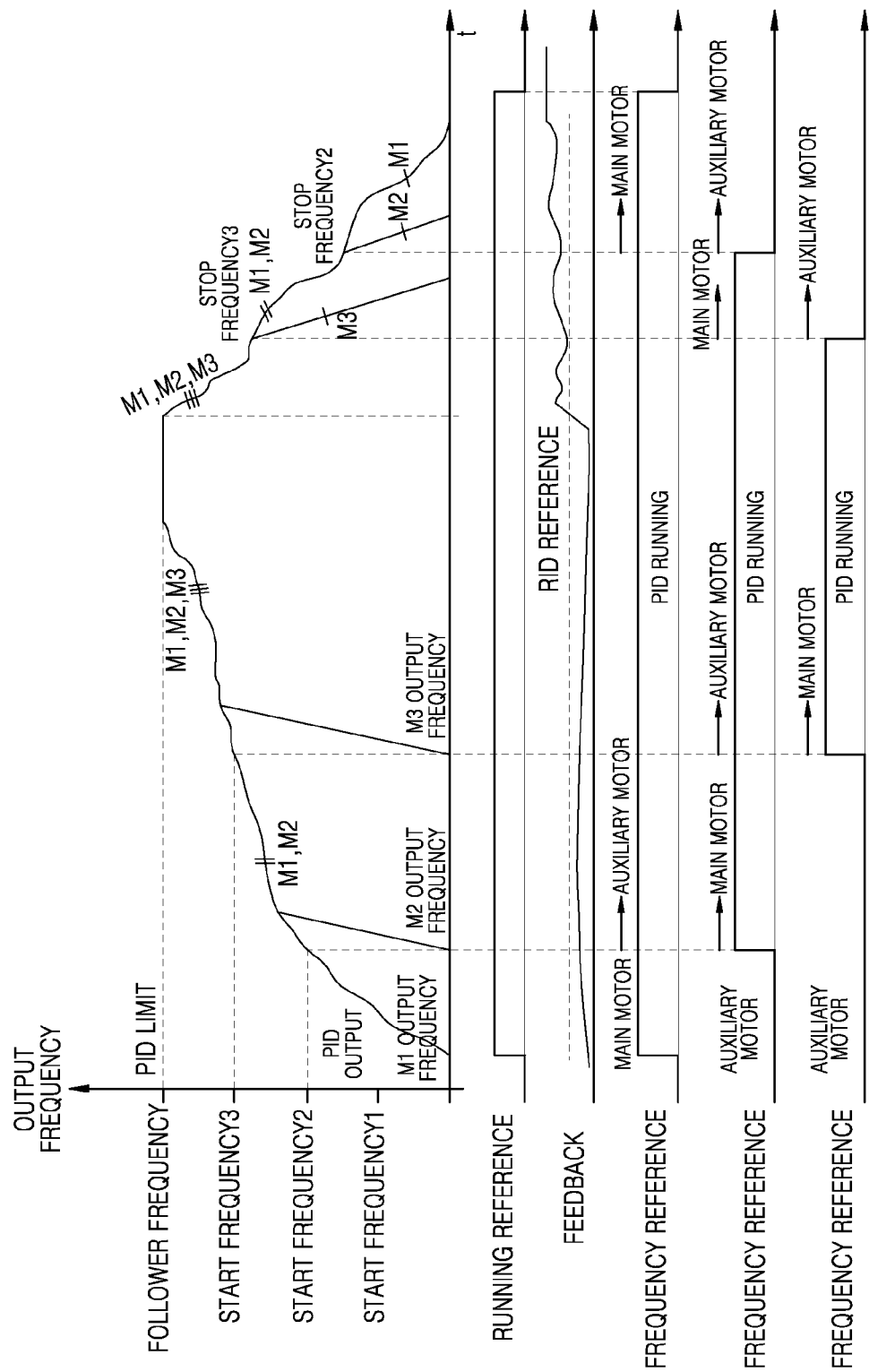
FIG. 7 is a graph illustrating a method in which a controlling unit according to an exemplary embodiment of the present disclosure performs a control in a multi-follow mode.

FIG. 7 is a graph illustrating a method in which a controlling unit according to an exemplary embodiment of the present disclosure performs a control in a multi-follow mode.

As illustrated in FIG. 7, since the feedback upon starting the system is smaller than the PID reference which is preset (i.e., stored in the storing unit 43), the controlling unit 40 may start the running by using a first motor 20 having the smallest running time as the main motor. However, according to an exemplary embodiment of the present disclosure, the first motor 20 connected to the leader inverter 10 is not run, but the motor having the smallest running time is run.

Here, even in the case where a running speed of the main motor 20 is a set speed (a start frequency 2 in FIG. 7) or more, when the feedback of the pipe 1 is less than the preset PID reference, the controlling unit 40 transmits a control command so that the first motor 20, which is currently being run, is operated as the auxiliary motor to generate pressure required by the system. In addition, the controlling unit 40 may select a motor (referred to as a second motor 21 in an exemplary embodiment of the present disclosure) having the shortest running time among the motors which are being stopped to thereby transmit a PID control command to the second motor 21 so that the selected motor is operated as the main motor.

Such an operation sequence may be repeated until all of the motors are run.

According to an exemplary embodiment of the present disclosure, although it is assumed that the running time is short in order of the first motor 20, the second motor 21, and the third motor 22, the order of motors which are run may be changed in other cases.

Thereafter, in the case where the feedback becomes greater than the set PID reference, the controlling unit 40 decelerates the running speed of the motor which is run as the main motor, and in the case where the feedback of the pipe 1 is a stop frequency or less which is preset by the manager, but is the set PID reference or more, the controlling unit 40 stops the motor which is currently being run as the main motor to decrease the feedback to the pressure required by the system. At the same time, the controlling unit 40 may convert a motor having the longest running time among the motors which are being run as the auxiliary motors, into the main motor to thereby transmit a control command so that the motor having the longest running time is PID-run.

As such, an operation sequence may be repeated until all of the motors are stopped.

That is, according to an exemplary embodiment of the present disclosure, the controlling unit 40 of the leader inverter 10 determines the motor having the smallest operation time among the auxiliary motors which are not operated, in the case where the speed of the main motor, which is being operated, is above a set speed, and the feedback is below a predetermined level. In addition, the controlling unit 40 may transmit the control command including the running reference and the frequency reference to the serve inverters connected to a motor which is newly determined as the main motor.

In addition, in the case where the speed of the main motor which is currently being operated is below the speed set by the user, and the feedback is above the predetermined level, the controlling unit 40 may stop the main motor which is currently being operated, and determine the motor having the longest operation time among the auxiliary motors which are being operated as a new main motor to thereby transmit the control command including the frequency reference to the serve inverters connected to the corresponding motor.

As described above, according to the exemplary embodiments of the present disclosure, the sensor feedback is received by only the leader inverter to simplify the wirings, and all of the inverters are connected to allow the leader inverter to control the remaining inverters, thereby making it possible to easily set the system, and to conveniently monitor the state of the entire system.

Further, according to the exemplary embodiment of the present disclosure, since the leader inverter sequentially controls the multiple inverters, the stress of the system caused by the water hammering phenomenon may be removed, and the system may be stably maintained even though the problem occurs in a specific inverter.

Further, according to the exemplary embodiment of the present disclosure, the running time of the multiple inverters is uniformly distributed, thereby making it possible to prevent the problem that the running time of the specific inverter is increased to thereby decrease the entire lifespan of the system. Although the exemplary embodiments of the present disclosure have been described, they are only illustrative. It will be appreciated by those skilled in the art that various modifications and equivalent other embodiments are possible from the exemplary embodiment of present disclosure. Accordingly, the actual technical protection scope of the present disclosure should be defined by the following claims.

What is claimed is:

1. An inverter system comprising:
a sensor configured to provide a feedback;
a leader inverter configured to receive the feedback and control a plurality of serve inverters; and a plurality of motors, each of which correspond to one of either the leader inverter or one of the plurality of serve inverters;

wherein the plurality of serve inverters are configured to transmit information related to a state, including an accumulated operation time of motors which are each connected to the serve inverters, to the leader inverter, and receive a running command and a frequency command, respectively, from the leader inverter;

wherein the leader inverter controlling the plurality of serve inverters is configured to:

responsive to a current speed of a main motor in operation being above a speed set by a user and the feedback being below a level set by the user:

determine, as the main motor, a motor having a smallest accumulated operation time among the plurality of motors which are not in operation; and transmit the running command and the frequency command to a first serve inverter connected to the newly determined main-motor, and responsive to the current speed of the current main motor in operation being below a speed set by the user and the feedback being above the level set by the user:

transmit a stop command to the main motor;

determine a as the main motor, a motor having a longest accumulated operation time among the plurality of motors in operation; and transmit the frequency command to a second serve inverter connected to the corresponding newly determined main motor.

2. The inverter system of claim 1, wherein, responsive to a current speed of a main motor in operation being above a speed set by a user and the feedback being below a level set by the user, the leader inverter is configured to convert the main motor in operation into an auxiliary motor that is in operation.

3. The inverter system of claim 1, wherein responsive to the current speed of the main motor in operation being below a speed set by the user and the feedback being above the level set by the user the leader inverter is configured to convert the main motor in operation into an auxiliary motor that is not in operation.

\* \* \* \* \*